United States Patent [19]

Wright

[11] Patent Number: 4,936,360
[45] Date of Patent: Jun. 26, 1990

[54] MOULDING MITRE CUTTING AND ROUTING APPARATUS

[76] Inventor: M. Bosley Wright, 2501 Greenspring Valley Rd., Owings Mills, Md. 21117

[21] Appl. No.: 399,617

[22] Filed: Aug. 28, 1989

Related U.S. Application Data

[63] Continuation-in-part of Ser. No. 32,361, Dec. 14, 1987, Pat. No. 4,858,664.

[51] Int. Cl.⁵ .................... B27M 3/00; B27C 5/00
[52] U.S. Cl. .................... 144/136 R; 144/2 R; 144/3 R; 144/353; 144/368; 144/371
[58] Field of Search ......... 144/2 R, 3 R, 3 M, 136 R, 144/134 R, 367, 368, 371, 353, 216

[56] References Cited

U.S. PATENT DOCUMENTS

| | | |
|---|---|---|
| 472,675 | 4/1892 | Linham . |
| 1,316,959 | 9/1919 | Keiser . |
| 1,409,258 | 3/1922 | Stenger . |
| 2,202,251 | 5/1940 | Gille . |
| 2,917,089 | 12/1959 | Ennis .................... 144/3 R |
| 3,251,388 | 5/1966 | Ennis .................... 144/3 R |
| 3,643,713 | 2/1972 | Massetani . |
| 4,098,310 | 7/1978 | Sanford et al. .................... 144/3 R |
| 4,265,282 | 5/1981 | Lenz . |
| 4,405,255 | 9/1983 | Wallace . |
| 4,593,734 | 6/1986 | Wallace . |
| 4,632,160 | 12/1986 | Wright . |
| 4,715,415 | 12/1987 | Wright . |

Primary Examiner—W. Donald Bray
Attorney, Agent, or Firm—William W. Haefliger

[57] ABSTRACT

An apparatus for mitre cutting an elongated moulding to produced a mitred end, and for cutting a groove in the end comprises a frame having longitudinal and lateral extent, and a laterally elongated table on the frame to receive and support a first portion of a moulding extending longitudinally; a first clamp on the frame for clamping the moulding to a first portion of the table; a first carriage supported by the frame to travel laterally back and forth, relative to the table; a first rotary disc cutter and a drive therefor supported on the carriage for cutting the clamped moulding laterally therethrough to produce the mitred end, as the carriage travels laterally; and a first router and a drive therefore supported by the carriage for laterally penetrating the mitred end of the moulding as the carriage travels laterally, for cutting the groove in the mitred end.

10 Claims, 5 Drawing Sheets

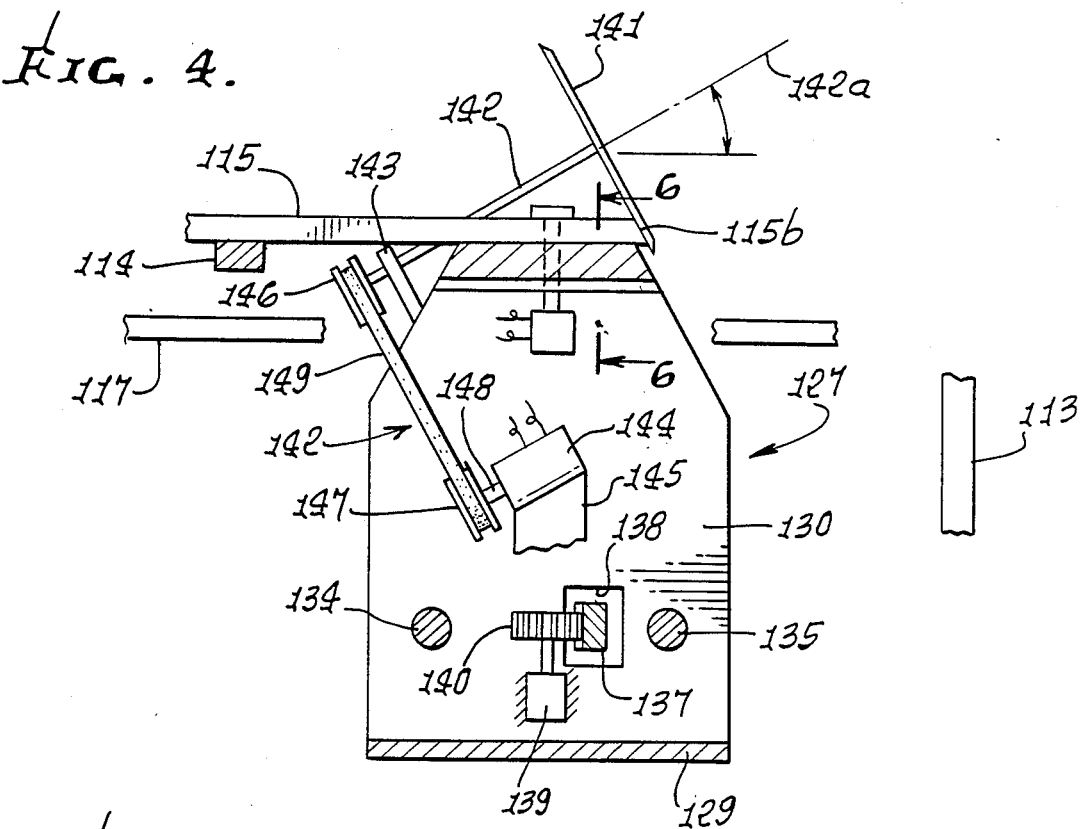
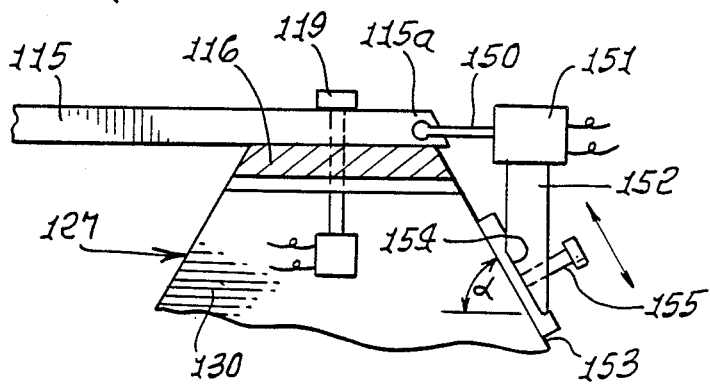
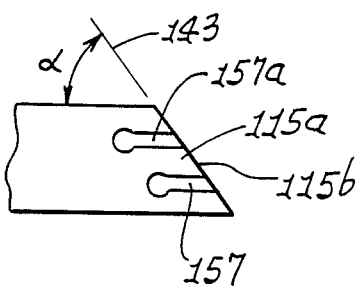
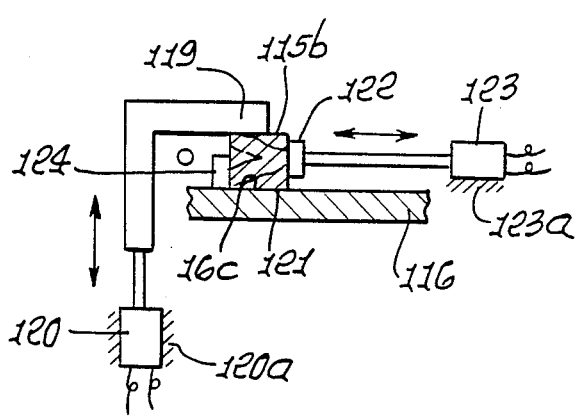

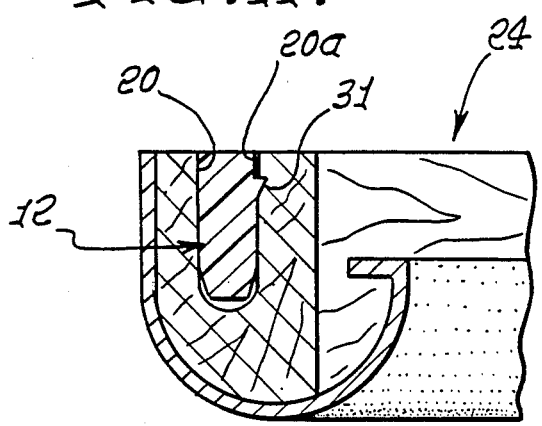
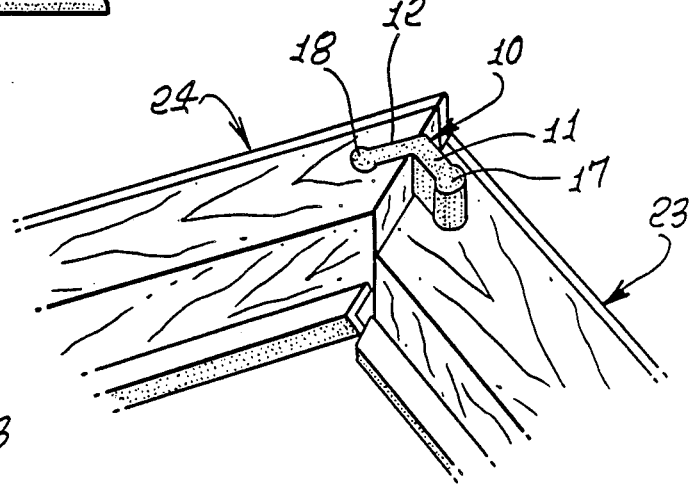
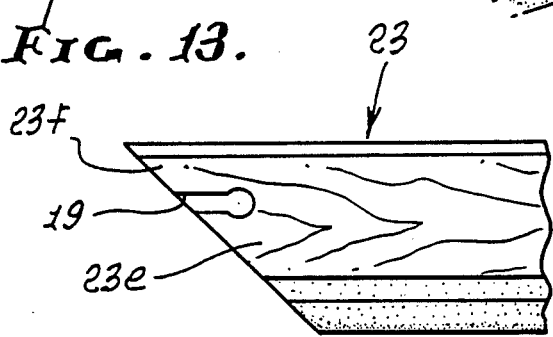
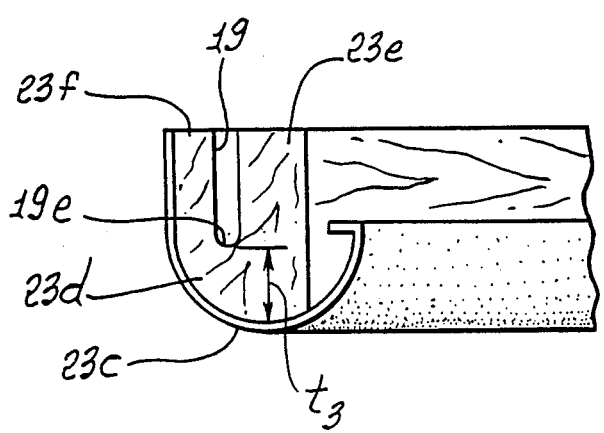

MOULDING MITRE CUTTING AND ROUTING APPARATUS

BACKGROUND OF THE INVENTION

This application is related to prior applications, Ser. Nos. 535,784, now U.S. Pat. No. 4,493,583 and 646,440, now U.S. Pat. No. 4,593,734, and constitutes a continuation-in-part of Ser. No. 132,361 filed Dec. 14, 1987, now U.S. Pat. No. 4,858,664.

This invention relates generally to production of mitred ends on mouldings or frame parts as well as formation of grooves in such mitred ends to receive corner brackets for holding multiple mouldings or such frame parts in assembled condition. More particularly, it concerns apparatus to cut mitred ends at selected positions along moulding lengths, and to produce recesses or grooves in such moulding ends, which will receive a bracket or brackets to interlock to such parts or mouldings.

There is continuing need for simple, effective, low cost, and easily assembled means to hold frame parts in corner anchored condition. The prior use of staples for this purpose is objectionable due to need for a staple gun and lack of staple strength sufficient to hold the frame parts together against relative bending displacement.

Further, there is need for simple, rugged, and easily operated means to form the above-described recesses in frame members at chosen mitred ends to receive L-shape brackets.

DETAILED DESCRIPTION

It is a major object of the invention to provide apparatus for cutting an elongated and clamped moulding to produce a mitred end, and then for cutting a groove in that end while the mouling remains clamped, whereby the mitre cut may be formed at any selected position along the length of a moulding or frame part, and the groove or grooves may then be rapidly and accurately formed in that mitred rod while the moulding remains clamped. Basically, the apparatus comprises:

(a) a frame having longitudinal and lateral extents, and a laterally elongated table on the frame to receive and support a selected first portion of a moulding, extending longitudinally, (b) first clamp means on the frame for clamping the moulding to the first portion of the table, (c) first carriage means supported by the frame to travel laterally back and forth, relative to the table, (d) a first rotary disc cutter and a drive therefor supported on the carriage for cutting the clamped moulding laterally therethrough to produce the mitred end, as the carriage travels laterally, as in one direction, (e) and a first router and a drive therefor supported by the carriage for laterally penetrating the mitred end of the moulding as the carriage travels laterally, as in an opposite direction, for cutting the groove in the end.

As will be seen, the disc cutter typically has an axis of rotation which extends in a longitudinally upright plane at an angle $\alpha$ relative to a longitudinal and lateral plane that is horizontal, the disc cutter overlapping the table; and the angle $\alpha$ is most typically 45°.

Further, the router typically has an axis of rotation which extends longitudinally horizontally, above the table, in laterally spaced relation to the disc cutter axis of rotation, enabling both mitre cutting and grooving as the carriage is traveled laterally back and forth. A drive is provided to travel the carriage as aforesaid, the drive carried by the frame, and control means is operatively connected with the drive to cause the drive to travel the carriage in one lateral direction for causing the disc cutter to cut the mitred end, and to cause the drive to travel the carriage in the opposite lateral direction to cause the router to penetrate the mitred end for forming the groove.

It is another object to provide support means on the frame for supporting the table and carriage to move longitudinally relative to the frame, to selected position relative thereto.

Yet another object is to provide:

(a') a second laterally elongated table on the frame to receive and support a second portion of the moulding, the moulding extending longitudinally, (b') second means on the frame for clamping the moulding second portion to the table, (c') second carriage means supported by the frame to travel laterally back and forth, relative to the table, (d') second rotary disc cutter and a drive therefor supported on the carriage for cutting the clamped moulding laterally therethrough to produce the mitred end, as the carriage travels laterally, (e') and a second router and a drive therefor supported by the carriage for laterally penetrating the mitred end of the moulding as the carriage travels laterally, for cutting the groove in the end, (f') the second table spaced longitudinally from the first table.

In this regard, the two tables may be integral to travel laterally back and forth together to speed up production of mitred ends and grooves therein.

Also, support means may be provided on the frame for supporting the second table and carriage to move longitudinally relative to the frame and relative to the first carriage and table, to selected positions relative thereto, and corresponding to a selected length moulding.

Finally, an angled ramp may be provided for supporting the router drive, together with adjustable means for adjusting the position of the drive, along the angled ramp, for selectively elevating or lowering the router, which correspondingly positions it longitudinally, to cut a pre-selected length groove in the mitred end of the moulding, at selected position along the mitre cut. The ramp is angled in parallel relation to the plane of the mitre cut. A second groove may then also be cut of proper length, and proper position relative to the slant cut mitred end.

These and other objects and advantages of the invention, as well as the details of an illustrative embodiment, will be more fully understood from the following specification and drawings, in which:

DRAWING DESCRIPTION

FIG. 4 is an enlarged fragmentary section taken on lines 4—4 of FIG. 2;

FIG. 5 is an enlarged fragmentary section taken on lines 5—5 of FIG. 2;

FIG. 6 is an enlarged fragmentary section taken on lines 6—6 of FIG. 4;

FIG. 7 is an enlarged side view of a mitre cut end portion of a moulding, with two side grooves cut in same;

FIG. 11 is a section on lines 11—11 of FIG. 10;

FIG. 12 is a perspective view showing partial assembly of frame parts and the bracket of FIG. 8;

FIG. 13 is a top plan view of a frame part showing a recess cut thereby to receive one leg of the FIG. 8 bracket; and FIG. 14 is a side view of the frame part of FIG. 13.

DETAILED DESCRIPTION

Figure 8:
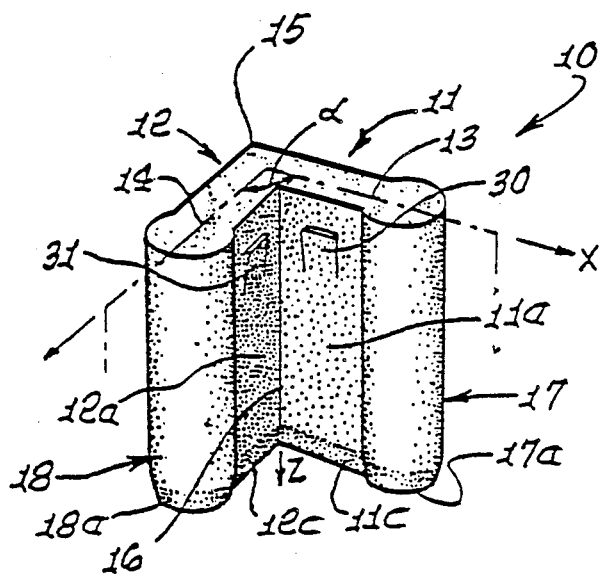
FIG. 8 is a perspective view of one side of a lock-up corner bracket.
Figure 9:
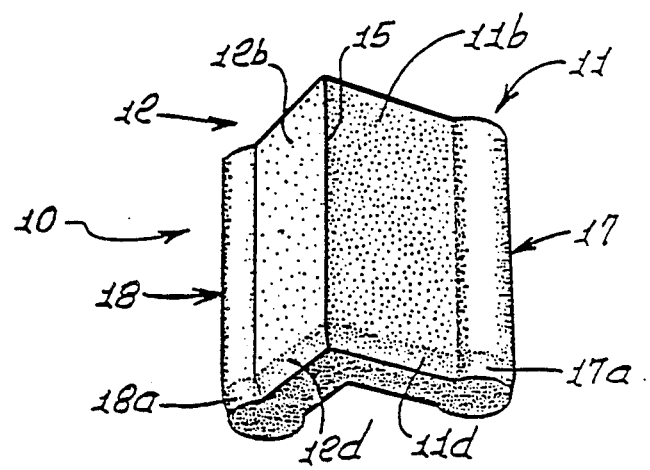
FIG. 9 is a perspective view of the opposite side of the FIG. 8 bracket.

In FIGS. 8 and 9, the illustrated lock-up corner bracket 10 is shown to include legs 11 and 12 that extend in planes 13 and 13 which define a corner angle $\alpha$. The latter is typically about 90°, but may vary somewhat from 90°, as for example between 85° and 95°. The leg 11 has opposite sides 11a and 11b which are longitudinally elongated in the Z direction indicated by arrow Z; and leg 12 has opposite sides 12a and 12b which are also elongated in the Z direction. Plane 13 is an X-Z plane, and plane 14 is an X-Y plane. Note inside and outside corners 15 and 15 of leg intersections.

The legs have terminal enlargements that are also elongated in parallel directions (parallel to Z-direction) of forward insertion of the legs relatively into recesses formed in the frame parts, for retaining such parts in assembled relation or conditions. In the example, the enlargements 17 and 18 are integral with legs 11 and 12, respectively, and are columnar, the plane 13 and 13 bisecting the enlargements.

Figure 10:
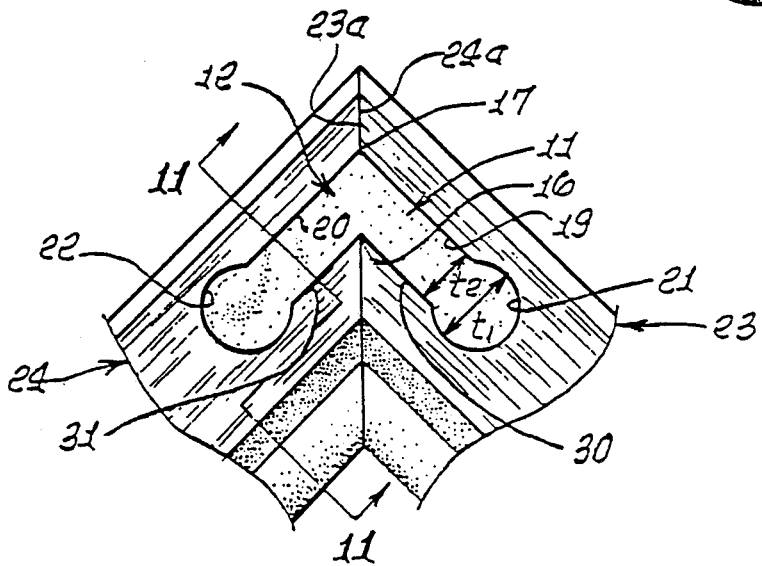
FIG. 10 is a plan view showing use of the FIG. 1 bracket in retaining frame parts in assembled conditions.

Note that the columnar enlargements have lengths approximately equal to the Z-direction lengths of the legs, and they have generally cylindrical outer surfaces throughout such lengths. Note also that the forwardmost end portions of the legs and enlargements are forwardly tapered (see tapers 11c and 11d, 12c, 17a, and 18a) to assist in their initial slide receptions into the corresponding recesses (leg and column) indicated at 19–22 in frame parts 23 and 24. Such slide reception is close in all such recesses, whereby the frame parts are rigidly positioned, as assembled, with 45° angled surfaces 23a and 24a held in face-to-face, sturdy interengagement. This is enhanced due to the columnar enlargements having cross-sectional dimensions "$t_1$" exceeding the thickness dimension "$t_2$" of the legs, as indicated in FIG. 10.

FIG. 12 shows an easy assembly mode (made possible by the present invention) wherein the leg 12 and column 18 are first inserted into the recesses 20 and 22 in part 24; and then the leg 11 and column 17 are relatively inserted into the recesses 19 and 21 in part 23 causing faces 23a and 24a to slide against one another until the assembly is completed with the tops of the legs and columns flush with the surfaces 23a and 24a of the frame parts 23 and 24. The latter frame parts may be those of a picture frame, with a bracket 10 easily assembled to the frame parts at each of the four corners of the picture frame. This enables the frame parts to be incorporated in a small kit suitable for mailing, so that the ultimate user can quickly assemble the frame using the improved corner brackets.

An additional feature is the provision of a barb or barbs on one or both legs of the bracket. See for example barbs 30 and 31 on legs 11 and 12 in FIG. 8. Such barbs integral with the bracket project outwardly from faces 11a and 12a, with forward taper, to compress the recess walls (see for example recess wall 20a in FIG. 11) during bracket insertion, and grip such walls to resist bracket removal from the recesses (i.e., to ensure that the parts 23 and 24 will remain assembled).

FIGS. 13 and 14 show details of a recess 19 prior to bracket insertion therein. Note that the recess terminates at point 19e, at a considerable spacing "$t_3$" from the bottom 23c of the frame part, so that the structural strength of the latter is not undesirably reduced (i.e., region 23d of the frame par remains unslotted so that sections 23e and 23f are not undesirably spread apart during bracket insertion). Sections 23e and 23f each have substantially constant width along their length for maximum strength, as enabled by the insertion.

The frame parts may consist of wood or plastic material, and the bracket may typically consist of plastic material, as for example molded polypropylene.

As is clear from FIG. 9, the forwardmost tapered portions of the legs 11 and 12 and the enlargements 17 and 18 terminate in a flat plane which is normal to the Z-direction of bracket insertion into the frame parts. See U.S. Pat. No. 4,493,583 to Wallace.

In FIGS. 1–4, frame 110 has longitudinal, horizontal, elongated frame members 111 and 112 which are laterally spaced, legs 13, and lateral cross members 114 for supporting moulding strips 115 extending longitudinally horizontally. Such moulding strips consist of wood, normally, but may consist of other material. Supported on the frame is a first laterally elongated table 116, at a level to also support the moulding strip 115. The table may extend laterally beyond members 11 and then downwardly at 116a and 116b to ride on longitudinal, horizontal, elongated support rods 117 and 117a, for adjustment purposes. After shifting of the table to a selected longitudinal position, hand clamps 118 carried by 116a, may be tightened to clamp against the rods 117 and 117a, retaining the table in adjusted position.

Figure 1:
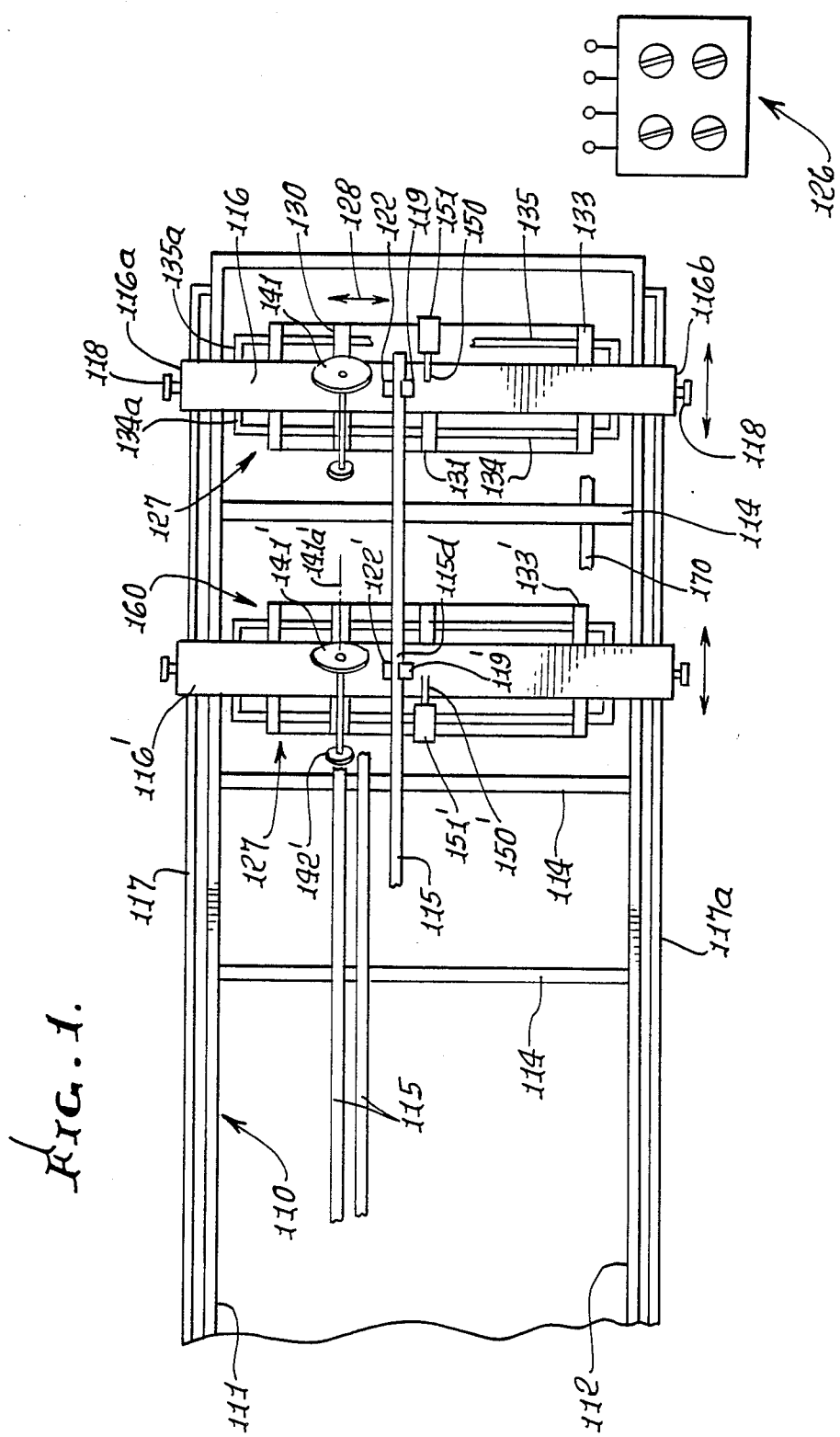
FIG. 1 is a plan view of apparatus embodying the invention.
Figure 2:
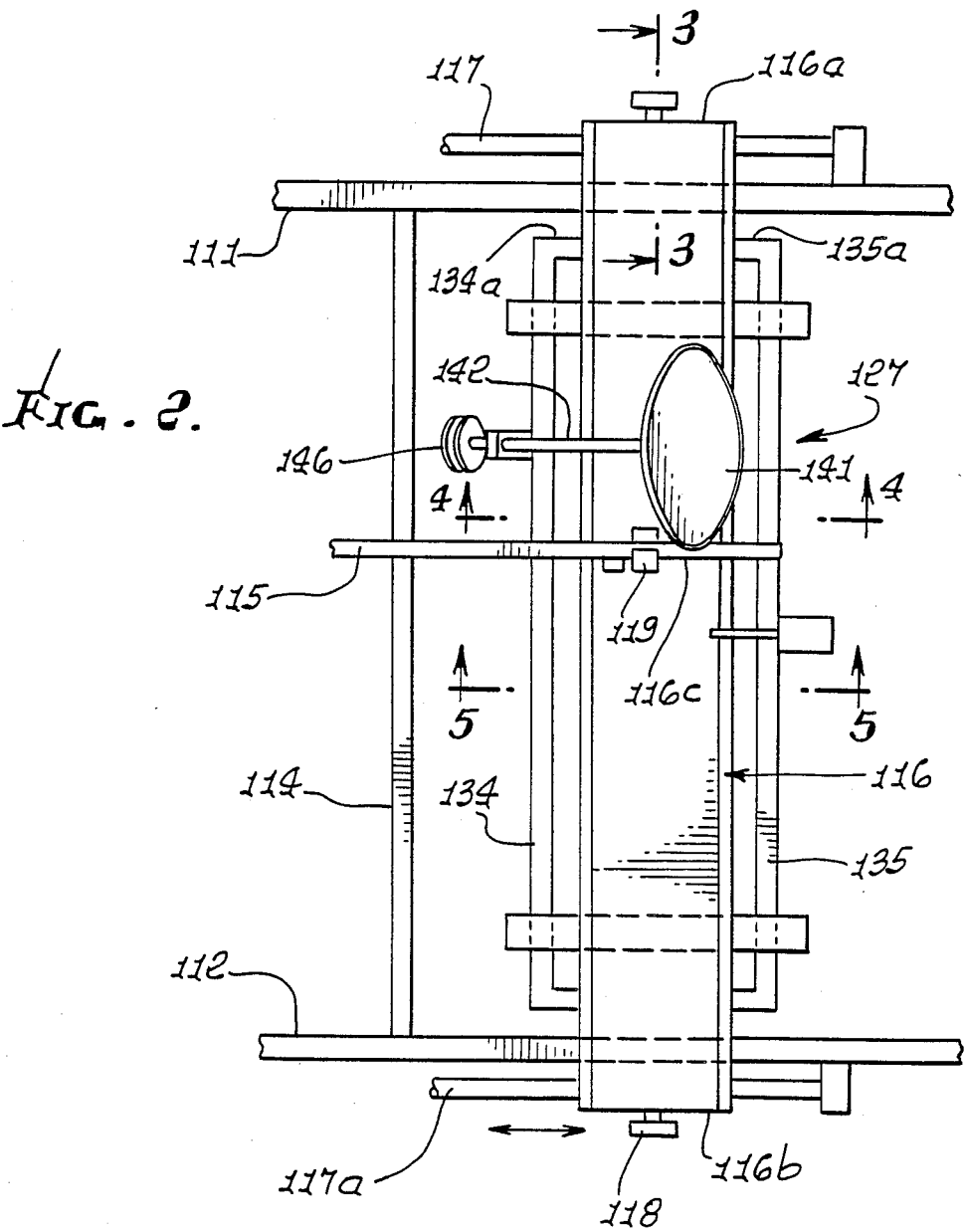
FIG. 2 is an enlarged plan view of one of the two mitre cutting and end groove units seen in FIG. 1.
Figure 3:
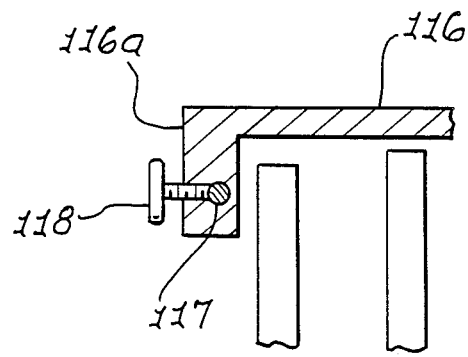
FIG. 3 is an enlarged section taken on lines 3—3 of FIG. 2.

First clamp means is provided on the frame for clamping the moulding 115 to a first portion 116c of the table. Such clamp means, as shown in FIG. 6, may include a clamp member 119 urged downwardly by an actuator 120 against the top of the moulding 115, to clamp the moulding at 121 to the table; and a second clamp member 122 urged laterally by actuator 123 to clamp the moulding 15 against an abutment 124 carried by the table. Thus, the moulding as clamped is precisely located relative to the table first portion 116c. The control indicated at 126 in FIG. 1 is operable to control all actuators as described and to be described. The actuators 120 and 123 may be suitably carried by the table 116 as indicated at 120a and 123a.

First carriage means indicated generally at 127 in FIGS. 1, 4 and 5 is supported by the frame 110 to travel laterally back and forth relatively to the table. Such travel indicated by arrows 128 in angle $\alpha$ 1. The carriage may include a base plate 129 and laterally spaced upright plates 130 and 131, as well as plates 132 and 133. Plates 130–133 ride on lateral guide rods 134 and 135 carried by the frame 110 to thereby guide the carriage for its lateral travel. Note rod attachments at 134a and 135a to table 16. A lateral rack 137 is also carried by the frame and passes through openings 138 in the plates 130–133. An actuator 139, carried for example by plate 130, drives a pinion 140 meshing with the rack, thereby to control and position the carriage movement laterally, stopping the carriage as required. Actuator 139 may be a step motor and is controlled by control system 126. Suitable feedback control may be provided for accuracy of carriage travel to selected positions, and slow lateral travel during mitre cutting and during groove cutting.

A first rotary disc cutter 141 and a drive 142 therefor is supported on the carriage for cutting the clamped moulding laterally therethrough to produce a mitred end of the moulding as the carriage travels laterally in one direction. See for example FIG. 7 showing moulding end portion 115a, cutting plane 143 of the cutter, and mitred end face 15b thereby produced at angle $\alpha$ relative to a horizontal plane. That angle $\alpha$ is typically 45°. The rotary drive for the disc cutter 141 may include disc shaft 142 supported at bearing 143, attached to plate 130; a drive motor 144 carried at 145 by plate 130; pulleys 146 and 147 respectively attached to shaft 142 and motor shaft 148; and a drive belt 149 engaging the pulleys. Cutter 141 has peripheral teeth.

Also provided is a first router 150, as seen in FIG. 5, and a rotary drive 151 therefore, controlled at 126. The drive 151 is supported at 152 on a ramp 153 as by a tongue and groove slide 154 (or alternately a rack), the slide controllably clamped at 155 to the ramp, whereby the slide may be adjusted along the ramp to position the router relative to the moulding mitred end. The angle $\alpha$ of the ramp is the same as the angle $\alpha$ of the mitre cut end of the moulding.

The ramp is located on plate 131 of the carriage, whereby when the carriage is traveled in the opposite lateral direction, the rotating router 150 sidewardly penetrates the mitred end portion 115a of the moulding to produce a groove 157 of required depth (see FIGS. 8-15). Slide adjustment along the ramp of the drive 151 allows the router to cut a second groove 157a, if required, and of the same length as groove 157, automatically. Accurate positioning of the grooves relative to plane 143 is thereby achieved.

It will be noted in FIG. 4 that the axis 142a of rotation of disc cutter 41 extends in a longitudinally upright plane at an angle $\alpha$ relative to a longitudinal and lateral plane that is horizontal, the disc cutter overlapping the table. It will also be noted that the router 150 has an axis of rotation 150a which extends longitudinally, horizontally above said table in laterally spaced relation to said disc cutter axis of rotation. Accordingly, when the carriage is controllably traveled in one lateral direction, the cutter disc 141 rapidly forms the mitred end face 115b (the moulding being clamped), and immediately afterward as the carriage is traveled in the opposite direction, the router 150 rapidly cuts the groove 157 to controlled depth, as determined by the master control 126.

Further, the mitred end face or cut may be made at any position along the length of the moulding, as selected by operation of the clamp members, no endwise positioning of the moulding against a stop being required, whereby knots or other defects in the moulding may be initially cut off by the mitre cutter.

Referring back to FIG. 1, a second mitre cutting end grooving apparatus is also provided as generally indicated at 160. It includes (a') a second laterally elongated table 116' on the frame to receive and support a second portion 115d of the moulding, the moulding extending longitudinally, (b') second means 119' and 122' on the frame for clamping the moulding second portion to the table, (c') second carriage means 127' supported by the frame to travel laterally back and forth, relative to the table, (d') a second rotary disc cutter 141' and a drive 142' therefor supported on the carriage for cutting the clamped moulding laterally therethrough to produce said mitred end, as the carriage travels laterally, (e') and a second router 150' and a drive 151' therefor supported by the carriage for laterally penetrating the mitred end of the moulding as the carriage travels laterally, for cutting said groove in said end, (f') said second table spaced longitudinally from the first table.

Accordingly, the elements of 160 correspond to the elements previously described for mitre cutting and laterally grooving the moulding, in the rapid and efficient manner described. One difference is the location of the cutter 141' to have its axis of rotation extending in a longitudinally upright plane at angle $\alpha'$ (it may be numerically the same as angle $\alpha$) relative to the horizontal plane for second cutter axis 141a' extending upwardly and in the opposite longitudinal direction from the longitudinal direction component of the first cutter axis 142a. Thus, the planes of the mitred cut ends of the moulding are perpendicular to one another in the case where angle $\alpha$ equals 45° and angle $\alpha'$ equals 45°.

The first and second carriages 127 and 127' may be made integral, i.e., connected if desired, as represented by a connector seen at 170 at FIG. 1 for connection to plates 133 and 133'. Alternatively, the like supporting of the tables 116 and 116' to the frame as via the rods 117, as described, enables the two tables to be adjusted longitudinally relative to each other where the tables ar not connected together.

I claim:

1. In apparatus for mitre cutting an elongated moulding to produce a mitred end, and for cutting a groove in said end, the combination comprising (a) a frame having longitudinal and lateral extent, and a laterally elongated table supported by the frame to receive and support a first portion of a moulding extending longitudinally, (b) first clamp means on the frame for clamping the moulding to the first portion of the table, (c) first carriage means supported by the frame to travel laterally back and forth, relative to the table, (d) a first rotary disc cutter and a drive therefor supported on the carriage for cutting the clamped moulding laterally therethrough to produce said mitred end, as the carriage travels laterally, (e) and a first router and a drive therefor supported by the carriage for laterally penetrating the mitred end of the moulding as the carriage travels laterally, for cutting said groove in said end, (f) and support means on the frame for supporting the table and carriage for movement longitudinally relative to the frame, to selected position relative thereto.

2. The combination of claim 1 wherein said disc cutter has an axis of rotation which extends in a longitudinally upright plane at an angle $\alpha$ relative to a longitudinal and lateral plane that is horizontal, the disc cutter overlapping said table.

3. The combination of claim 2 wherein said angle is 45°.

4. The combination of claim 2 wherein said router has an axis of rotation which extends horizontally longitudinally.

5. In apparatus for mitre cutting an elongated moulding to produce a mitred end, and for cutting a groove in said end, the combination comprising (a) a frame having longitudinal and lateral extent, and a laterally elongated table on the frame to receive and support a first portion of a moulding extending longitudinally, (b) first clamp means on the frame for clamping the moulding to the first portion of the table, (c) first carriage means supported by the frame to travel laterally back and forth, relative to the table, (d) a first rotary disc cutter and a drive therefor supported on the carriage for cutting the clamped moulding laterally therethrough to produce said mitred end, as the carriage travels laterally, (e) and a first router and a drive therefor supported by the carriage for laterally penetrating the mitred end of the moulding as the carriage travels laterally, for cutting said groove in said end, (f) and including a drive to effect said travel of said carriage as aforesaid, the drive carried by the frame, and including control means operatively connected with the drive to cause the drive to travel the carriage in one lateral direction for causing the disc cutter to cut said mitred end, and to cause the drive to travel the carriage in the opposite lateral direction to cause the router to penetrate the mitred end for forming said groove.

6. In apparatus for mitre cutting an elongated moulding to produce a mitred end, and for cutting a groove in said end, the combination comprising (a) a frame having longitudinal and lateral extent, and a laterally elongated table on the frame to receive and support a first portion of a moulding extending longitudinally, (b) first clamp means on the frame for clamping the moulding to the first portion of the table, (c) first carriage means supported by the frame to travel laterally back and forth, relative to the table, (d) a first rotary disc cutter and a drive therefor supported on the carriage for cutting the clamped moulding laterally therethrough to produce said mitred end, as the carriage travels laterally, (e) and a first router and a drive therefor supported by the carriage for laterally penetrating the mitred end of the moulding as the carriage travels laterally, for cutting said groove in said end, (f) a second laterally elongated table on the frame to receive and support a second portion of the moulding extending longitudinally, relative to the frame, (g) second means on the frame for clamping the moulding second portion to the table, (h) second carriage means supported by the frame to travel laterally back and forth, relative to the table, (i) a second rotary disc cutter and a drive therefor supported on the carriage for cutting the clamped moulding laterally therethrough to produce said mitred end, as the carriage travels laterally, (j) and a second router and a drive therefor supported by the carriage for laterally penetrating the mitred end of the moulding as the carriage travels laterally, for cutting said groove in said end, (k) said second table spaced longitudinally from the first table.

7. The combination of claim 6 wherein said first and second carriage means are integral.

8. The combination of claim 7 including support means on the frame for supporting the second table and carriage to move longitudinally relative to the frame and relative to the first carriage and table, to selected positions relative thereto, and corresponding to a selected length moulding.

9. The combination of claim 7 wherein said first disc cutter has a first axis of rotation which extends in a longitudinal upright plane at an angle $\alpha$ relative to a longitudinal and lateral plane which is horizontal, and the second disc cutter has a second axis of rotation which extends in a longitudinal upright plane at an angle $\alpha$ relative to said horizontal plane, said first axis of rotation extends upwardly and in one longitudinal direction, and said second axis extending upwardly and in the opposite longitudinal direction.

10. The combination of claim 1 including a ramp supporting the router drive, and adjustable means for adjusting the position of the drive, along the ramp, for selectively elevating or lowering the router to correspondingly position it longitudinally, to cut a preselected length groove in said mitred end of the moulding, at selected position along the mitre cut, the angularity of the ramp having pre-selected relation to the angularity of the mitre cut.

* * * * *